Oct. 29, 1957 G. F. GOEHRING 2,810,975
ANIMATED DISPLAY DEVICE
Filed Jan. 18, 1956 3 Sheets-Sheet 1
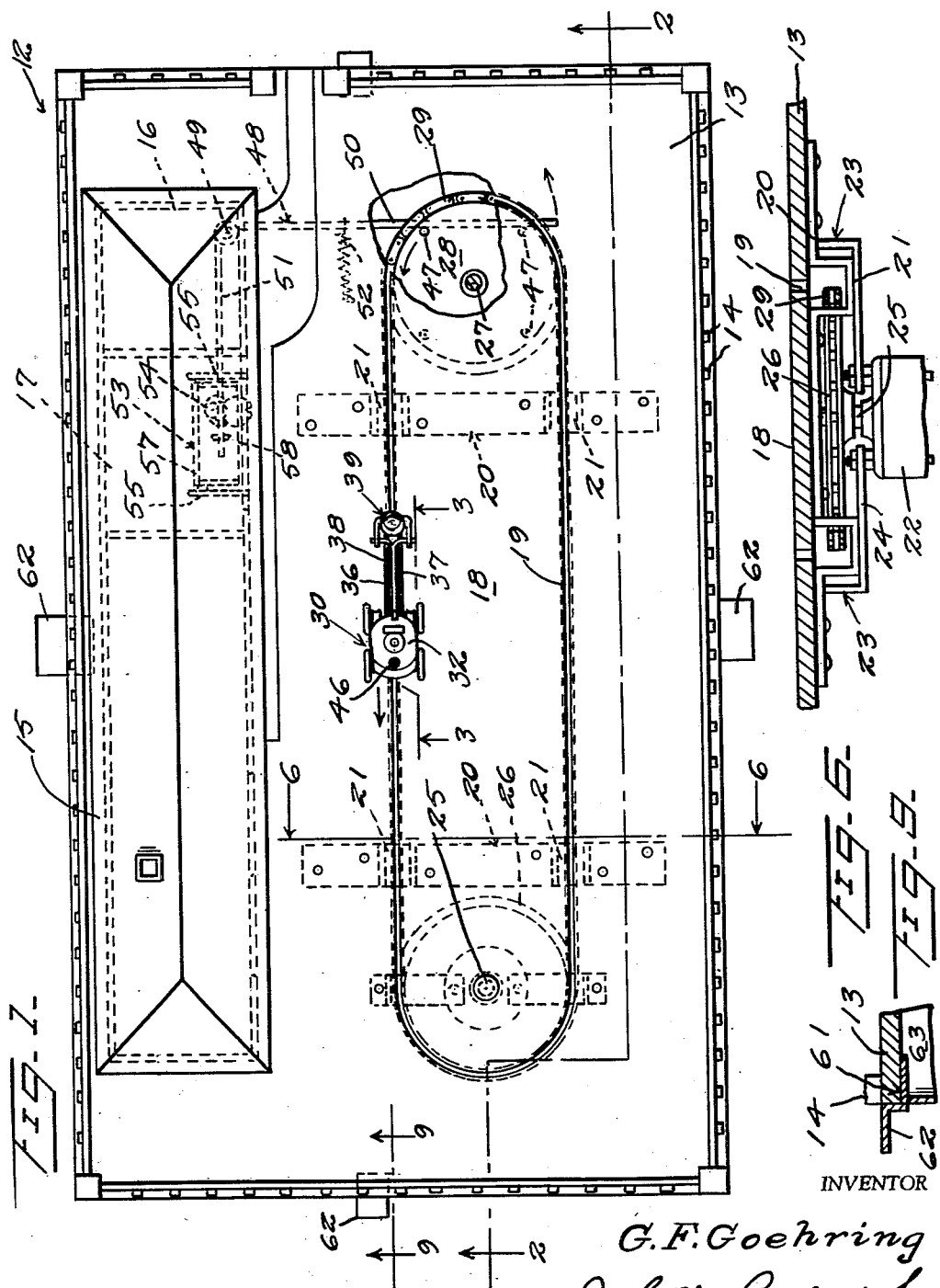
INVENTOR
G. F. Goehring
BY John N. Randolph
ATTORNEY Oct. 29, 1957 G. F. GOEHRING 2,810,975
ANIMATED DISPLAY DEVICE
Filed Jan. 18, 1956 3 Sheets-Sheet 2
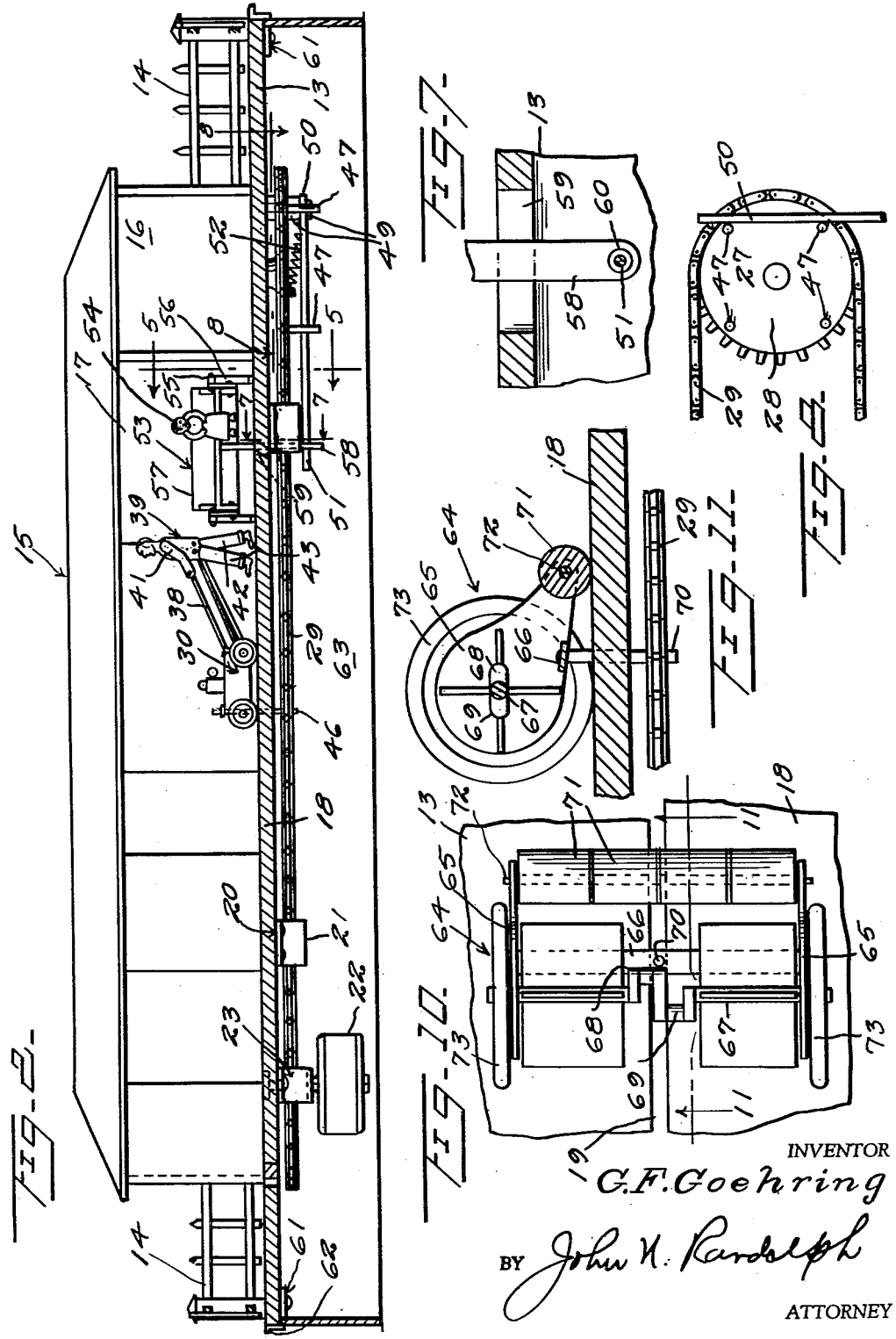
INVENTOR
G. F. Goehring
BY John H. Randolph
ATTORNEY

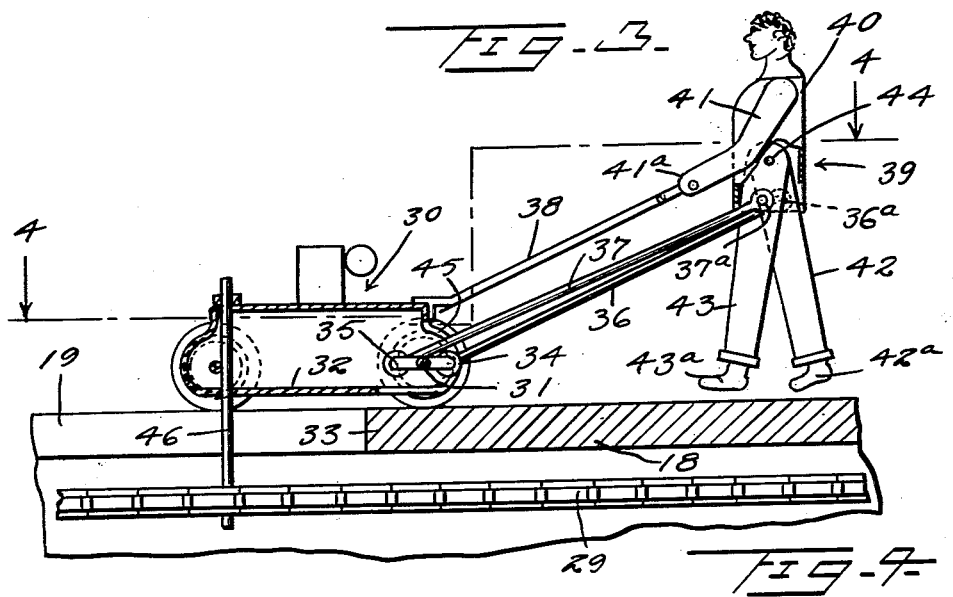
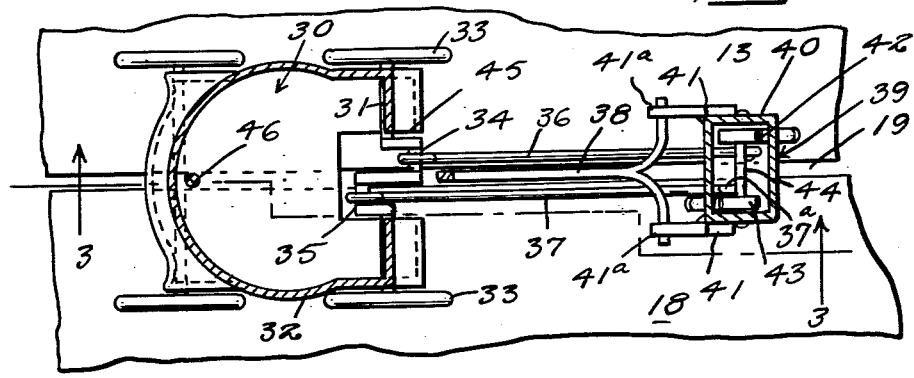
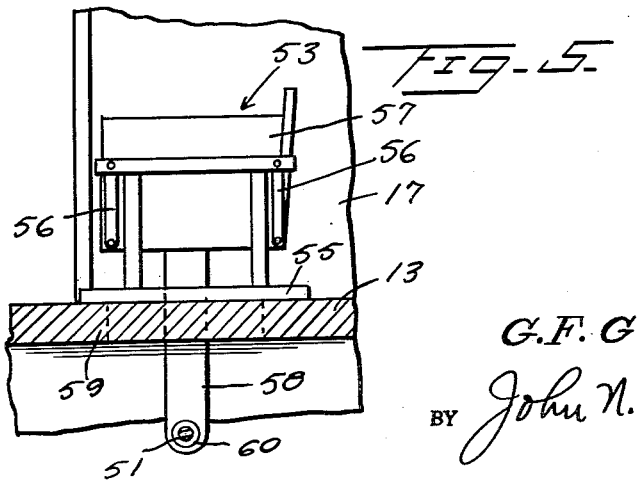

2,810,975
Patented Oct. 29, 1957

2,810,975

ANIMATED DISPLAY DEVICE

George F. Goehring, West Newton, Pa.

Application January 18, 1956, Serial No. 559,837

1 Claim. (Cl. 40—126)

This invention relates to a novel animated display device which readily adapts itself for use with a display beneath a Christmas tree or as an advertising display in connection with a show window or counter of a store.

More particularly, it is an aim of the present invention to provide a display device including a power source and a plurality of power take-off means driven from said power source for simultaneously driving a plurality of objects having different types of movements whereby said objects will execute movements very realistically simulating actual movements of parts of which said objects of the device constitute simulations.

Still a further object of the invention is to provide a display device having a novel coordinated drive driven from a common power source for producing a coordinated movement of animated objects, constituting parts of the display device, and wherein the different animated objects have different forms of movement.

Various other objects and advantages of the invention will hereinafter become more fully apparent from the following description of the drawings, illustrating presently preferred embodiments thereof, and wherein:

Figure 1 is a top plan view of a preferred embodiment of the display device, partly broken away and partly in section;

Figure 2 is an enlarged longitudinal sectional view thereof, taken substantially along a plane as indicated by the line 2—2 of Figure 1;

Figure 3 is an enlarged vertical sectional view taken substantially along a plane as indicated by the lines 3—3 of Figures 1 and 4;

Figure 4 is a horizontal sectional view, taken substantially along a plane as indicated by the line 4—4 of Figure 3;

Figure 5 is an enlarged transverse sectional view, taken substantially along a plane as indicated by the line 5—5 of Figure 2;

Figure 6 is an enlarged transverse vertical sectional view, taken substantially along a plane as indicated by the line 6—6 of Figure 1;

Figure 7 is an enlarged fragmentary detailed vertical sectional view, taken substantially along a plane as indicated by the line 7—7 of Figure 2;

Figure 8 is a fragmentary horizontal sectional view on a reduced scale, taken substantially along a plane as indicated by the line 8—8 of Figure 2;

Figure 9 is an enlarged fragmentary detailed vertical sectional view taken substantially along a plane as indicated by the line 9—9 of Figure 1;

Figure 10 is a fragmentary plan view of a slightly modified form of the simulated lawn mower, and Figure 11 is a vertical sectional view thereof, taken substantially along a plane as indicated by the line 11—11 of Figure 10.

Referring more specifically to the drawings, and first with reference to Figures 1 to 9, the animated display device in its entirety and comprising the invention is designated generally 12 and includes a platform 13. The platform 13 is preferably colored to simulate a lawn and has a simulated fence 14 rising therefrom adjacent the marginal edges thereof. A simulated dwelling 15 of the ranch house type is supported on the platform 13 within the fence 14 and adjacent and along one edge of said platform. The simulated ranch house 15 includes a garage 16 and a simulated breezeway 17, as illustrated in Figure 2.

An elongated section 18 having rounded ends is cut out of the platform 13 to provide an elongated endless slot 19 in said platform, between the main body thereof and said section 18. The section 18 and slot 19 are preferably disposed in front of the dwelling 15 and substantially parallel thereto, as seen in Figure 1.

Said section 18 is supported immovably in the platform 13 and substantially coplanar therewith by rigid supporting members 20 which are secured to the underside of the section 18 and platform 13 and which are disposed crosswise of said section 18. Said supporting members 20 have downwardly offset portions 21 disposed beneath the slot 19. A small power source such as a low speed electric motor 22 is disposed beneath one end of the section 18 and is supported by means of a pair of brackets 23 having outer ends which are secured to the underside of the platform 13 and downwardly offset inner ends 24 to which the casing of the motor 22 is secured. The motor 22 has an upwardly extending drive shaft 25 to which is fixed a sprocket wheel 26 which is disposed beneath an end of the section 18. The shaft 25 is disposed axially with respect to the adjacent arcuate end portion of the slot 19. A journal member 27 is fixed to and extends downwardly from said section 18, adjacent its opposite end and is disposed axially with respect to the other arcuate end of the slot 19. An idler sprocket wheel 28 is journalled on said member 27 and is supported thereby beneath and substantially parallel to the platform 13 and section 18 and substantially coplanar with the drive sprocket wheel 26. An endless chain 29 is trained around the sprocket wheels 26 and 28 and travels beneath the marginal edge of the section 18.

A simulated motor or power-driven lawn mower 30 is disposed to run on the platform 13 and section 18 on front and rear wheels thereof, which engage and run on the parts 13 and 18. A rear axle 31 is journalled in side portions of the frame 32 of the lawn mower 30. The rear wheels 33, or at least one of said rear wheels, are fixed to the axle 31 so that said axle is revolved by the rear wheel or wheels 33 when the lawn mower 30 is moving translationally due to traction engagement of the wheel or wheels 33 with the upper surface of the platform 13 and/or section 18. The intermediate portion of the axle 31 is provided with a pair of cranks 34 and 35. Complementary ends of a pair of connecting rods 36 and 37 are journalled on the cranks 34 and 35, respectively. A rigid member 38, simulating a lawn mower handle is rigidly fixed to the upper rear portion of the lawn mower frame 32 and extends upwardly and rearwardly therefrom. A human simulating Figure 39, which may be constructed to simulate a man, includes a rigid body 40 having arms 41 rigidly connected thereto and extending forwardly therefrom, having rigid simulated hand portions 41a which are rigidly connected to the other upper rear end of the handle member 38, for supporting the Figure 39 behind the lawn mower 30 and above the platform 13 and section 18. The legs 42 and 43 of the figure 39 are pivoted to swing forwardly and rearwardly relative to the body 40 about a pivot pin 44 which extends transversely through the upper portions of said legs and through a lower portion of the body 40. As best seen in Figure 3, the body 40 is hollow and is open at its bottom to afford ample clearance for swinging movement of the legs 42 and 43. The figure 39 is supported by the handle member 38 at an elevation so that the undersides of the simulated feet 42a and 43a will just clear the upper surface of the platform 13 and section 18. The rear portion of the mower frame 32 is provided with an opening 45 through which the connecting rods 36 and 37 loosely extend rearwardly from the cranks 34 and 35. Said connecting rods extend upwardly and rearwardly and have their opposite rear ends connected by pivot elements 36a and 37a to the legs 42 and 43, below but near the leg pivot 44. A pin or rigid element 46 is fixed to the mower frame 32 and extends downwardly therefrom loosely through the slot 19. A lower portion of the pin or rigid element 46 is secured to the outer side of one link of the chain 29.

The idler sprocket wheel 28 is provided with a plurality, preferably four, pins or studs 47 which are fixed to and extend downwardly therefrom. The studs 47 are equally spaced from the axis of the sprocket wheel 28 and are equally spaced from one another, as best seen in Figure 8. A bell crank 48 is journalled at its apex on a fastening 49 which is fixed to and extends downwardly from a part of the platform 13 and by means of which the bell crank 48 is swingably disposed beneath and substantially parallel to said platform. The bell crank 48 includes the arms 50 and 51, which extend from the pivot 49, susbtantially at a right angle to one another. The longer arm 50 extends substantially crosswise of the platform 13 and has an end portion thereof disposed beneath an end of the section 18 and beneath a portion of the sprocket wheel 28 and chain 29 to be engaged by the pins or studs 47 of said sprocket wheel 28. One end of a pull spring 52 is anchored to the underside of the platform 13 and the other end of said pull spring is connected to an intermediate portion of the bell crank arm 50 for urging said bell crank 48 to swing clockwise as seen in Figure 1 about its pivot 49 and for urging the outer portion of said arm 50 toward and into engagement with the pins or studs 47.

A simulated glider 53, on which is supported a figure 54, is disposed in the breezeway 17 and is supported on a portion of the platform 13. The figure 54 simulates a lady disposed in a seated position on the glider. The glider 53 is shown in end elevation in Figure 5 with the figure 54 omitted. Said glider includes rigid end supports 55 which are fixed to and rise from the platform 13 and each of which is provided with a pair of swingably mounted depending hangers 56, the lower ends of which are pivotally connected to the ends of the body 57 of the glider 53 to permit the glider body 57 to swing to the right and left as seen in Figure 5 or forwardly and rearwardly as seen in Figures 1 and 2. A rigid bar 58 is fixed and extends downwardly from a portion of the underside of the glider body 57 through an elongated slot 59 in the platform 13 which accommodates swinging movement of the bar 58 with the glider body 57. The other shorter bell crank arm 51 extends generally lengthwise of the platform 13 and has a portion spaced from the free end thereof which extends loosely through an opening 60 which is formed in the bar 58 and disposed below the platform 13.

The platform 13 is provided with supporting brackets 61 which are secured to its underside and which have upwardly offset outer ends 62 which extend outwardly from the side edges and ends of said platform and which are disposed substantially in the same plane as the top surface of the platform 13. When the animated display device 12 is utilized in connection with a Christmas tree platform, for example, a hole of a proper size is cut in the conventional Christmas tree platform, not shown, to receive the plaftorm 13 which is supported therein by the bracket portions 62 resting on the upper surface of the Christmas tree platform, around the opening thereof in which the platform 13 is disposed. If the display device 12 is utilized as a show window or counter display, the platform 13 is provided with a depending surrounding apron or wall 63 which extends downwardly from the edges thereof a sufficient distance to support the display device 12 with the parts disposed below the platform 13 located above the level of a supporting surface on which the bottom edge of the wall or apron 63 rests. Where the wall or apron 63 is utilized the brackets 61 may be omitted or vice versa.

Assuming that the display device 12 is set up for use in either way as heretofore described, and that the electric motor 22 is connected to a source of electric current, when said motor is energized the shaft 25 thereof will drive the sprocket wheel 26 in a counterclockwise direction as seen in Figure 1 so that the chain 29 and sprocket wheel 28 will likewise move counterclockwise. Thus, the mower 30 and figure 39 will move about an elongated oval path traveling in a counterclockwise direction, from right to left as seen in Figure 1 toward the left hand end of the platform section 18. In this manner, the lawn mower 30 and the figure 39 will travel in an oval path in front of the house 15 very realistically simulating the movement of a power mower driven by a man for cutting a lawn. It will be understood that the mower 30 will travel in unison with the chain 29 with the pin 46 which connects said mower to the chain 29 traveling in the slot 19. As the mower 30 is thus propelled the rear wheels 33 will be revolved by contact with the platform 13 and section 18 to cause the axle 31 and its cranks 34 and 35 to revolve. Reciprocating movement of the connecting rods 36 and 37 in opposite directions will cause the legs 42 and 43 of the figure 39 to be oscillated in opposite directions so that as one leg is swinging forwardly the other leg will be swinging rearwardly, to thus very realistically simulate the movement of the legs of a person while walking. As previously stated, figure 39 is supported by the handle 38 with the feet 42a and 43a above and just out of contact with the platform 13 and section 18.

At the same time that this movement of the lawn mower 30 and figure 39 is occurring, the glider body 57 supporting the figure 54 will be swinging forwardly and rearwardly to very realistically simulate the actual movement of a glider or swing. Motion is imparted to the glider body 57 from the power source 22 by the bell crank 48. As the idler sprocket wheel 28 is driven counterclockwise as seen in Figure 1 by the chain 29 from its position of Figure 1, the stud 47 located at the upper right hand corner of the square formed by the four studs will move out of contact with the lever arm 50 while the next following stud, which is shown in contact with the lever arm 50 and in a lower right hand corner position, will swing counterclockwise and in its arcuate travel to the right from its position as shown to a position in alignment with the shafts 25 and 27, will cause the lever arm 50 to be swung to the right as seen in Figure 1. Thereafter as the stud travels through another arc of 45° to the upper right hand corner position as seen in Figure 1, the spring 52 will return the lever arm 50 to its position of Figure 1 by a clockwise swinging movement of the lever arm. Obviously, the other lever arm 51 will be oscillated in unison with the lever arm 50 about the pivot 49 and this oscillating movement of the lever arm 51 will be imparted to the bar 58 and the glider body 57 so that the glider body 57 will swing on its hangers 56 forwardly and rearwardly, back and forth right and left as seen in Figure 5. Thus, operation of the power source 22 will simultaneously produce animation of the lawn mower 30 and figure 39 and, in combination with the spring 52, will also animate the glider 53. The motor shaft 25 and the gears 26 and 28 are preferably driven at a speed of approximately 8 R. P. M. by the motor 22 to cause the animated parts of the device 12 to be operated at speeds which will appear normal for the objects simulated thereby.

Figures 10 and 11 illustrate another form of lawn mower, designated generally 64, only a part of which has been shown and which may be utilized in lieu of the lawn mower 30. The lawn mower 64 simulates a conventional "hand mower" and includes a pair of side members 65 which are rigidly connected in spaced apart parallel relation to one another by a cross member 66. The parts 65 and 66 constitute the lawn mower frame. An axle 67 is journalled in the side members 65 and has wheels 73 connected thereto and which engage the platform 13 and section 18. At least one wheel 73 is fixed to the axle 67 which is thus driven in the same manner as the axle 31. Axle 67 has cranks 68 and 69 which function in the same manner and for the same purpose as the cranks 34 and 35 to drive connecting rods, not shown, which function for the same purpose as the connecting rods 36 and 37. A handle, not shown, is fixed to the side members 65 to function in the same manner as the handle 38 for supporting a figure, not shown. A rigid pin or connecting element 70 is fixed to and extends downwardly from the cross member 66 loosely through the slot 19 and has its lower end fixed to the outer side of a link of the chain 29, for the same purpose as the connecting element 46. Rollers 71 are journalled on an axle 72, which extends through the rear ends of the frame members 65, and engage the platform 13 and section 18, rearwardly of the wheels 73, to cooperate therewith to prevent rocking movement of the lawn mower.

Various other modifications and changes are contemplated and may obviously be resorted to, without departing from the function or scope of the invention as hereinafter defined by the appended claim.

I claim as my invention:

An animated display device comprising a platform, a power source, means supporting the power source beneath the platform, a driving sprocket wheel disposed beneath the platform and directly connected to and supported and driven by the power source, an idler sprocket wheel, means rotatably mounting the idler sprocket wheel beneath the platform and spaced from the driving sprocket wheel, an object supported for movement on the platform, an endless chain trained over said sprocket wheels and driven by the driving sprocket wheel, and means forming a connection between the object and a part of the chain for propelling the object on the platform in a path corresponding to the path of movement of said chain when the power source is actuated; the improvement which comprises a second object, means supported by the platform and supporting the second object for oscillating movement above the platform and at a point spaced from the path of travel of the first mentioned object, and means forming a driving connection between said idler sprocket wheel and said second object whereby the second object will be oscillated when the idler sprocket wheel is driven by the chain, said means forming the driving connection between the second object and the idler sprocket wheel comprising a plurality of studs fixed to and projecting from the plane of the idler sprocket wheel and disposed in spaced apart relation to one another and to the axis of the idler sprocket wheel, a bell crank swingably supported by the platform having one end loosely connected to a part of said second object and an opposite end disposed to be engaged by said studs when the idler sprocket wheel is revolved for swinging the bell crank in one direction, and spring means connected to the bell crank and platform for swinging the bell crank in the opposite direction.

References Cited in the file of this patent

UNITED STATES PATENTS

| | | |
|---|---|---|
| 673,587 | Steward | May 7, 1901 |
| 1,359,809 | Karg | Nov. 23, 1920 |
| 1,802,884 | Diedrichs | Apr. 28, 1931 |
| 2,240,439 | Fisher | Apr. 29, 1941 |
| 2,265,710 | Wooten | Dec. 9, 1941 |
| 2,641,867 | McEntyre et al. | June 16, 1953 |
| 2,645,880 | Richter | July 21, 1953 |